May 8, 1923.  1,454,569
T. H. THOMAS
BRAKE VALVE DEVICE
Filed April 22, 1921  2 Sheets-Sheet 1
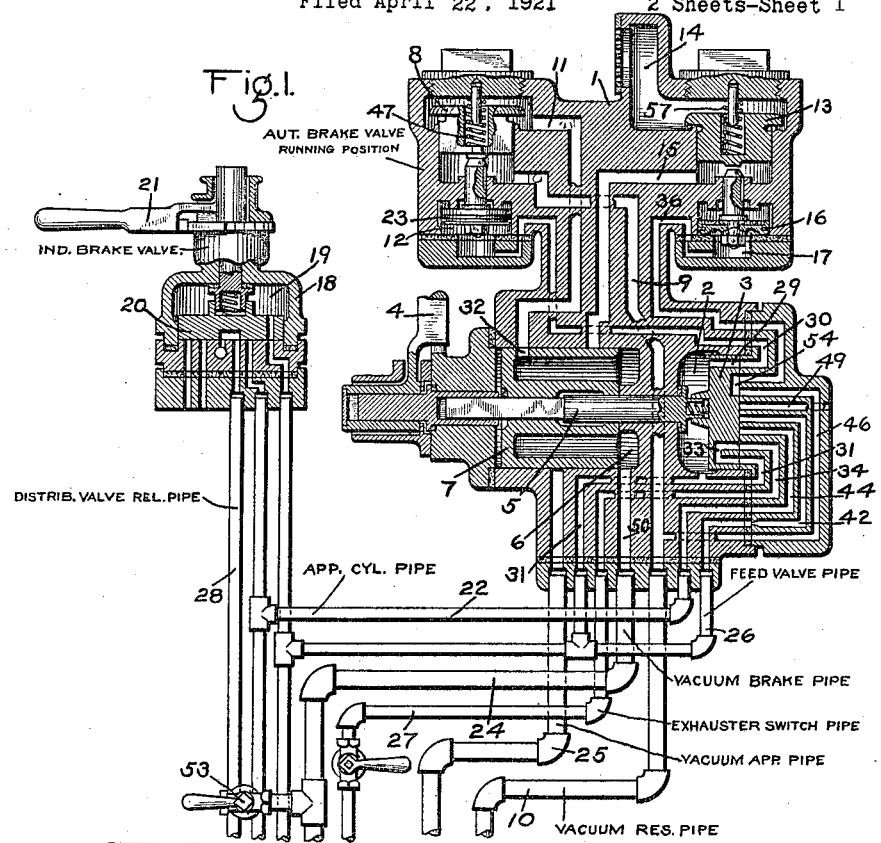
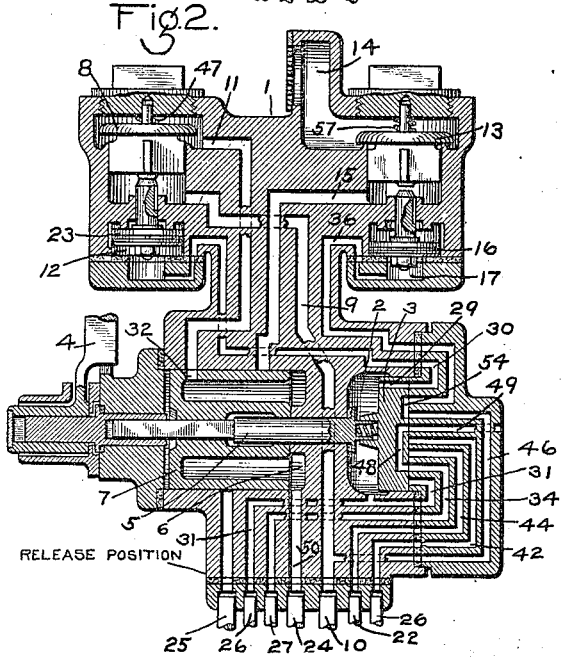
INVENTOR
THOMAS H. THOMAS
BY Wm. M. Cady
ATTORNEY May 8, 1923.

T. H. THOMAS 1,454,569

BRAKE VALVE DEVICE

Filed April 22, 1921

2 Sheets-Sheet 2

SERVICE POSITION

EMERG. POSITION

INVENTOR
THOMAS H. THOMAS
BY Wm. M. Cady
ATTORNEY

Patented May 8, 1923.

1,454,569

UNITED STATES PATENT OFFICE.

THOMAS H. THOMAS, OF EDGEWOOD, PENNSYLVANIA, ASSIGNOR TO THE WESTING-HOUSE AIR BRAKE COMPANY, OF WILMERDING, PENNSYLVANIA, A CORPORATION OF PENNSYLVANIA.

BRAKE-VALVE DEVICE.

Application filed April 22, 1921. Serial No. 463,700.

*To all whom it may concern:*

Be it known that I, THOMAS H. THOMAS, a citizen of the United States, residing at Edgewood, in the county of Allegheny and State of Pennsylvania, have invented new and useful Improvements in Brake-Valve Devices, of which the following is a specification.

This invention relates to vacuum brakes, and more particularly to a brake valve device for a vacuum brake system.

The principal object of my invention is to provide an improved brake valve device for controlling vacuum brakes.

Other objects and advantages will appear in the following more detailed description of the invention.

Figure 3:
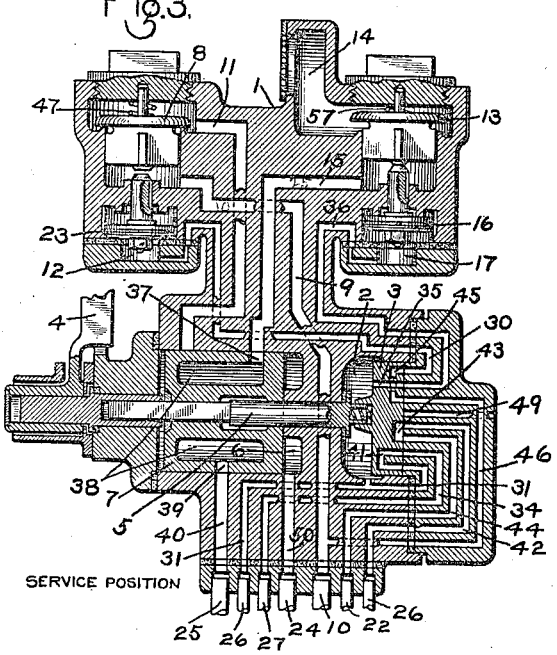
Figure 4:
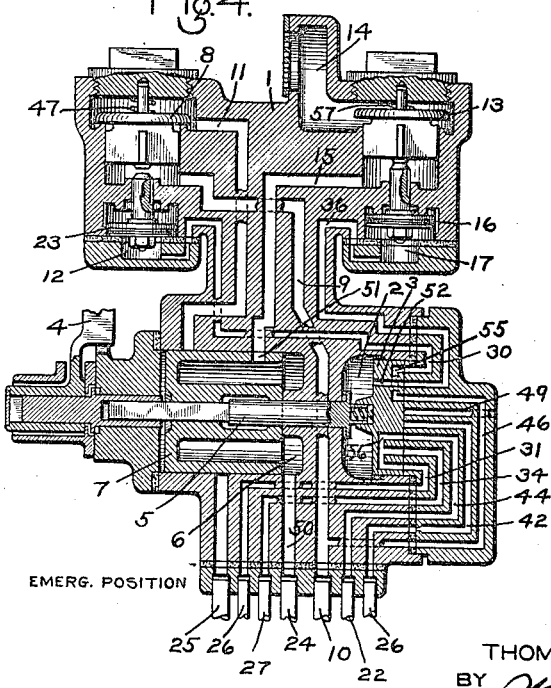

In the accompanying drawings; Fig. 1 is a central sectional view of an independent brake valve device and an automatic brake valve device for vacuum brakes, with the automatic brake valve in running position, and embodying my invention; Fig. 2 a central sectional view of the automatic brake valve device, showing the parts in release position; Figs. 3 and 4 views similar to Fig. 2, showing the parts in service and emergency application positions respectively.

As shown in the drawings, the automatic brake valve device may comprise a casing 1 having a valve chamber 2 containing a rotary valve 3 adapted to be operated by a handle 4 which is operatively connected to the rotary valve stem 5.

Mounted in a chamber 6 of the valve casing 1 is a drum valve 7, also operatively connected to the valve stem 5, so that the drum valve 7 is operated by the handle 4, with the rotary valve 3.

A relay release valve 8 controls communication from a passage 9, communicating with a vacuum reservoir pipe 10, to a passage 11, and is adapted to be pneumatically operated by means of a piston 23 contained in piston chamber 12.

A relay application valve 13 controls communication from an atmospheric inlet port 14 to a passage 15 and is adapted to be operated by a piston 16 contained in piston chamber 17.

The independent brake valve device may comprise a casing 18, having a valve chamber 19 containing a rotary valve 20 adapted to be operated by a handle 21.

The various pipes controlled by the brake valves correspond with the pipes employed in controlling the vacuum brake equipment as set forth in my prior pending application, Serial No. 443,360, filed February 8, 1921, and applications of Clyde C. Farmer, Serial No. 442,941, filed February 7, 1921, and Serial No. 445,780, filed February 17, 1921.

In order to avoid unnecessarily complicated drawings and in view of the fact that the brake equipment is fully shown and described in the above mentioned patent applications, it is deemed sufficient for the purposes of the present invention to merely show the brake valve devices with the various pipe connections.

The pipes shown may be briefly defined as follows: The application cylinder pipe 22 connects with the application cylinder of the disturbing valve device; the vacuum reservoir pipe 10 connects with a reservoir maintained at a partial vacuum; the vacuum brake pipe 24 is a pipe normally maintained at a partial vacuum, an increase in pressure in which is adapted to effect an emergency application of the brakes; the vacuum application pipe 25 is a pipe normally maintained at a partial vacuum, an increase in pressure in which is adapted to effect a service application of the brakes; the feed valve pipe 26 is normally maintained at a predetermined pressure less than main reservoir pressure according to the adjustment of the usual feed valve device; the exhauster switch pipe 27 supplies and exhausts fluid under pressure to and from a switch device for regulating the speed of a pump which maintains the partial vacuum in the vacuum reservoir; and the distributing valve release pipe 28 is for controlling the independent release of fluid from the brake cylinder on the locomotive.

In operation, in the running position of the automatic brake valve device, a port 29 through the rotary valve 3 registers with passage 30 leading to piston chamber 12 and since the rotary valve chamber 2 is constantly supplied with fluid at feed valve pressure from pipe 26 through passage 31, fluid at feed valve pressure will be supplied to piston chamber 12, operating the piston 23 to open the valve 8.

With valve 8 open, the vacuum brake pipe 24 is maintained at a partial vacuum by being connected with the vacuum reservoir, through vacuum reservoir pipe 10, passage 9, past the valve 8 to passage 11, through registering port 32 in the drum 7 to chamber 6 and thence to the vacuum brake pipe 24.

In running position, the exhauster switch pipe 27 is supplied with fluid under pressure from the feed valve pipe 26, through passage 31, cavity 33 in rotary valve 3, to passage 34.

To effect a service application of the brakes, the automatic brake valve is turned to service position, as shown in Fig. 3 of the drawings. In this position, fluid under pressure is supplied from the rotary valve chamber 2 through port 35 and registering passage 36 to piston chamber 17, so that the piston 16 is operated to open the application valve 13 and admit fluid at atmospheric pressure to the vacuum application pipe 25, through passage 15, port 37 of the drum valve 7 to chamber 38 in said valve, and thence through pipe 39 to passage 40 and the vacuum application pipe 25. The increase in pressure in the vacuum application pipe then causes a service application of the brakes, as fully described in application Serial No. 445,780.

Fluid under pressure is also supplied to the passage 34 leading to the exhauster switch pipe 27, through cavity 41 in the rotary valve 3.

In service position, fluid under pressure is supplied to the application cylinder pipe 22 through passage 42, cavity 43 in rotary valve 3, and passage 44.

Piston chamber 12 is connected to the vacuum reservoir pipe 10, through passage 30, cavity 45 in rotary valve 3 and passage 46, thereby producing a partial vacuum in piston chamber 12. The opposite side of the piston 23 being also connected to the vacuum reservoir pipe through passage 9, the fluid pressures on opposite sides of the piston are equalized, permitting the spring 47 to maintain the valve 8 closed.

In order to release the brakes, the automatic brake valve device is turned to release position, as shown in Fig. 2 of the drawings. The connections in this position are the same as those in running position as hereinbefore described, except that the exhauster switch pipe 27 is connected to the atmosphere through passage 34, cavity 48 in the rotary valve 3 and exhaust port 49.

The release valve 8 being opened as in running position, the vacuum reservoir is connected to the vaccum brake pipe 24 and the brakes are then released by the creation of a partial vacuum in the vacuum brake pipe.

In order to effect an emergency application of the brakes, the automatic brake valve is turned to emergency position, as shown in Fig. 4 of the drawings.

In this position, the vacuum application pipe 25 is blanked at the drum valve 7 and the vacuum brake pipe 24 is connected directly to the atmosphere, through passage 50, chamber 6, port 51, passage 15, and past the open application valve 13 to the atmospheric inlet port 14, the valve 13 having been moved to open position by piston 16, since passage 36 is connected to valve chamber 2 through port 52 in rotary valve 3, so that fluid under pressure is supplied to piston 16.

Since the relay application valve 13 is dependent for operation upon fluid supplied at feed valve pressure from the main reservoir, if main reservoir pressure should fail for any reason, the manipulation of the brake valve would not cause an application of the brakes as intended.

In order to provide for this contingency, an auxiliary emergency cock 53 is connected to the vacuum brake pipe 24 and upon failure of main reservoir pressure, if it is desired to effect an application of the brakes, the cock 53 is opened, so as to admit fluid at atmospheric pressure to the vacuum brake pipe and thus cause an emergency application of the vacuum brakes.

Having now described my invention, what I claim as new and desire to secure by Letters Patent, is:

1. In a vacuum brake, the combination with a vacuum brake pipe, of a source of compressed fluid, a valve device operated by fluid under pressure from said source for supplying fluid to the vacuum brake pipe, and manually operated means for controlling the fluid pressure on said valve device.

2. In a vacuum brake, the combination with a vacuum brake pipe, of a valve device operated by fluid under pressure for exhausting fluid from the vacuum brake pipe and manually operated means for controlling the fluid pressure on said valve device.

3. In a vacuum brake, the combination with a vacuum brake pipe, of a brake valve device comprising a fluid pressure controlled valve device for supplying fluid to and a fluid pressure controlled valve device for exhausting fluid from said brake pipe and manually operated means for controlling the fluid pressure on said valve devices.

4. In a vacuum brake, the combination with a vacuum brake pipe, of a brake valve device comprising a valve and piston for controlling the supply of fluid to and a valve and piston for controlling the exhaust of fluid from said brake pipe and a manually operated valve for controlling the fluid pressure on said pistons.

5. In a vacuum brake, the combination with a vacuum brake pipe and a vacuum application pipe, of a valve device for supplying fluid to said pipes and a manually operated valve for establishing communication for supplying fluid from said valve device to the vacuum brake pipe in one position and to the vacuum application pipe in another position.

6. In a vacuum brake, the combination with a vacuum brake pipe, an increase in pressure in which is adapted to effect an emergency application of the brakes, and a vacuum application pipe, an increase in pressure in which is adapted to effect a service application of the brakes, of a manually operated valve for connecting said valve device to the vacuum brake pipe in one position and to the vacuum application pipe in another position.

7. In a vacuum brake, the combination with a vacuum brake pipe, of a fluid pressure operated valve device for supplying fluid to said pipe, a manually operated valve for establishing communication for supplying fluid from said valve device to the brake pipe, and a manually operated valve for controlling the fluid pressure for operating said valve device.

8. In a vacuum brake, the combination with a vacuum brake pipe, of a fluid pressure operated valve device for exhausting fluid from said brake pipe, a manually operated valve for establishing communication from said valve device to the brake pipe, and a manually operated valve for controlling the fluid pressure for operating said valve device.

9. In a vacuum brake, the combination with a vacuum brake pipe, of a fluid pressure operated valve device for controlling the supply of fluid to said pipe, a manually operated valve for controlling the fluid pressure on said valve device, and an auxiliary manually operated valve for also supplying fluid to the vacuum brake pipe.

In testimony whereof I have hereunto set my hand.

THOMAS H. THOMAS.